United States Patent [19]

Hassenpflug

[11] Patent Number: 4,844,383

[45] Date of Patent: Jul. 4, 1989

[54] APPARATUS FOR REDUNDANT AXIS STABILIZATION AND CONTROL OF AN AIRCRAFT

[75] Inventor: Wolfgang Hassenpflug, Freiburg im Breisgau, Fed. Rep. of Germany

[73] Assignee: Litef GmbH, Freiburg im Breisgau, Fed. Rep. of Germany

[21] Appl. No.: 53,130

[22] Filed: May 22, 1987

[30] Foreign Application Priority Data

May 22, 1986 [EP] European Pat. Off. ........ 86106961.5

[51] Int. Cl.$^4$ ............................................. B64C 13/16
[52] U.S. Cl. ..................................................... 244/79
[58] Field of Search .......................... 244/79, 175, 177; 364/453, 566, 559; 33/321; 73/178 R; 74/5.34

[56] References Cited

U.S. PATENT DOCUMENTS

| | | | |
|---|---|---|---|
| 2,550,806 | 5/1951 | Hammond | 244/79 |
| 3,158,340 | 11/1964 | Sellers | 244/79 |
| 3,391,568 | 7/1968 | Dozier, Jr. | 73/178 R |
| 3,463,909 | 8/1969 | Weiss | 73/178 R |
| 3,489,004 | 1/1970 | Barnhill et al. | 73/178 R |
| 3,614,401 | 10/1971 | Lode | 244/79 |
| 3,918,309 | 11/1975 | O'Connor et al. | 74/5.34 |
| 4,125,017 | 11/1978 | Dhuyvetter et al. | 74/5.34 |
| 4,179,818 | 12/1979 | Craig | 74/5.34 |
| 4,212,443 | 7/1980 | Duncan et al. | 244/165 |
| 4,280,188 | 7/1981 | Weinstein et al. | 74/5.34 |

Primary Examiner—Galen L. Barefoot
Attorney, Agent, or Firm—Elliott N. Kramsky

[57] ABSTRACT

Apparatus for stabilization and control of an aircraft includes a pair of strapdown devices that are rigidly fixed in space relative to one another. Each device includes two two-axis gyroscopes, permitting the generation of triple redundancy. The measurement axes ($M_{11}$, $M_{12}$ and $M_{21}$, $M_{22}$) have different arrangements in the horizontal plane. The redundant axis of each strapdown device is arranged in such a way (preferably at 45 degrees) that an allocation to the two horizontal measurement axes is provided by computational transformation.

10 Claims, 3 Drawing Sheets

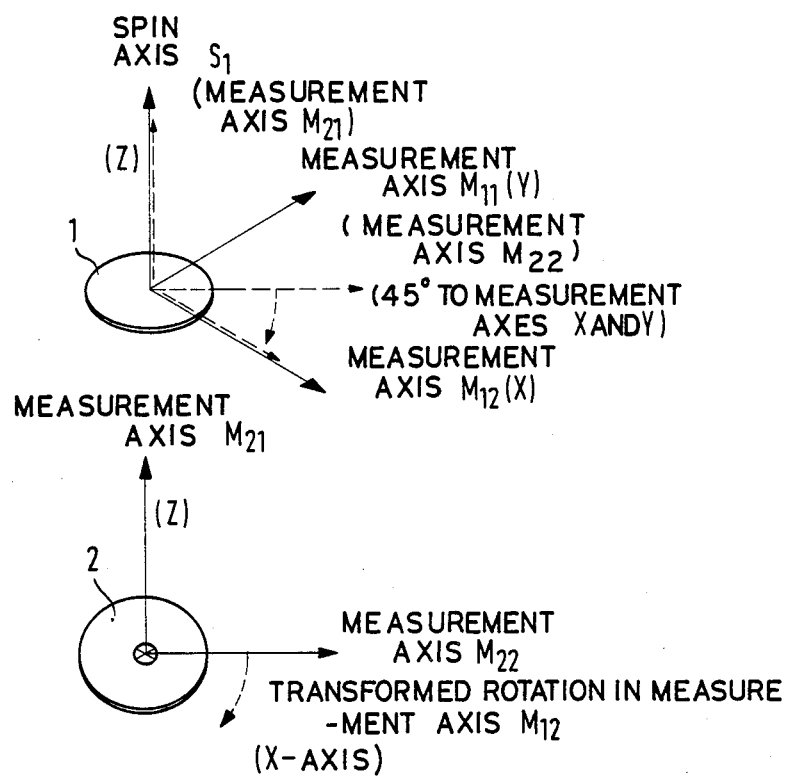

APPARATUS FOR REDUNDANT AXIS STABILIZATION AND CONTROL OF AN AIRCRAFT

BACKGROUND

1. Field of the Invention

The present invention relates to the control and stabilization of the flight attitude of an aircraft. More particularly, this invention pertains to an arrangement for increasing axis stabilization and control by enhancing redundancy.

2. Description of the Prior Art

Angular velocities about the major axes of an aircraft (e.g. fixed wing, rotating wing and flying bodies) provide the primary parameters for the stabilization and control of flight attitude. Such measurements can be taken, for example, by three gyroscopes oriented in the directions of the main axes or by a strapdown device having either three single-axis gyroscopes, (e.g. laser gyroscopes) or two gyroscopes, each with two measurement degrees of freedom (e.g. a dry tuned gyroscope).

The technically feasible reliability of such devices is generally insufficient. As a consequence, multiple redundancy is utilized to increase reliability (i.e. reduce the probability of failure). This requires one to determine the possibly erroneous behavior of one or such redundantly-arranged measuring devices. That determination requires at least three measured values so that a decision (majority voting) can be formed in a computation and decision process.

Simple multiple redundancy arrangements unfortunately increase both weight and cost. In recognition of this, a system in which either of two strapdown devices is arranged at an angle of $\alpha \neq n\frac{1}{2}\pi$ (n = 1, 2, ...) has been proposed. (Sebring, Young 1984, "Application of Multifunction Strap-down Inertial Systems", AGARD Lecture Series No. 133, Advances in Strapdown Inertial Systems). It has been further proposed to equip the sensor block of a strapdown system with several non-orthogonal gyroscopes as the minimum necessary for measurement about three axes in space (Keller 1979, "Ueber redundante Strapdownsensorkonfigurationen der inertialen Ortung und Navigation" (Redundant Strapdown Sensor Configurations in Inertial Position Finding and Navigation), Diplomarbeit, TU Berlin 1979.)

The format approach permits installation of the two devices at different locations in the aircraft and therefore offers decreased vulnerability as well as greater availability of measured values. A disadvantage lies in the fact that the generally-rectangular devices require substantially greater space since they cannot be installed parallel, anti-parallel or orthogonal to the main axes of the aircraft. Special design measures are therefore required, such as special installation fixtures and calibration methods, as opposed to devices which can be installed parallel or anti-parallel to the main axes.

The latter design is limited insofar as the redundancy is generally limited to the gyroscope and associated recording and drive electronics, while redundancy of electronics of the associated digital computer, interfaces and power supply are not considered. Thus, actual failure rates are not considered.

SUMMARY AND OBJECTS OF THE INVENTION

It is therefore an object of the invention to provide an improved, triple redundant arrangement for an aircraft.

A further object of the invention is to achieve the foregoing object, at least in the case of the two axes that are critical to flight safety, without special installation features and/or aircraft modifications.

The present invention addresses and overcomes the shortcomings of the prior art while achieving the preceding objects by providing, in a first aspect, apparatus for stabilization and control of an aircraft. Such apparatus includes a pair of strapdown devices, rigidly oriented with respect to each other in space. Each device includes two two-axis measuring gyroscopes. The measurement axes of the gyroscopes of each device have different arrangements in the horizontal plane so that triple redundancy of measurement is provided by the apparatus for at least two aircraft axes. The arrangement of measurement axes in the horizontal plane is defined by a computational transformation.

In a second aspect, the invention provides a strapdown device for stabilization and control of an aircraft. Such device includes a pair of two-axis measuring gyroscopes. The spin axes of such gyroscopes are orthogonal. The spin axis of the first gyroscope is aligned with the yaw axis of the aircraft while the spin axis of the second gyroscope is aligned with the pitch axis of the aircraft. A first measurement axis of the second gyroscope is aligned in the direction of the yaw axis and the measurement axes of the first gyroscope are orthogonal and oriented at an angle of 45 degrees with respect to the second measurement axis of the second gyroscope.

In a third aspect, the invention provides a strapdown device for stabilization and control of an aircraft. In such a device, the spin axis of a first gyroscope is aligned with the yaw axis while the spin axis of the second gyroscope is aligned at a right angle to that of the first gyroscope and at 45 degrees to a preselected axis of the aircraft. One measurement axis of the second gyroscope is aligned with the yaw axis of the aircraft and the measurement axis of the first gyroscope is aligned with the preselected axis.

The foregoing features and advantages of the invention will become further apparent from the detailed description that follows. This description is accompanied by a set of drawing figures. Numerals of the drawings, corresponding to those of the written description, point to the various features of the invention, like numerals referring to like features throughout.

BRIEF DESCRIPTION OF THE DRAWINGS

FIGS. 2 and 3 are diagrammatic views of gyro axis transformations for forming a strapdown system in accordance with the present invention.

DETAILED DESCRIPTION

Figure 1:
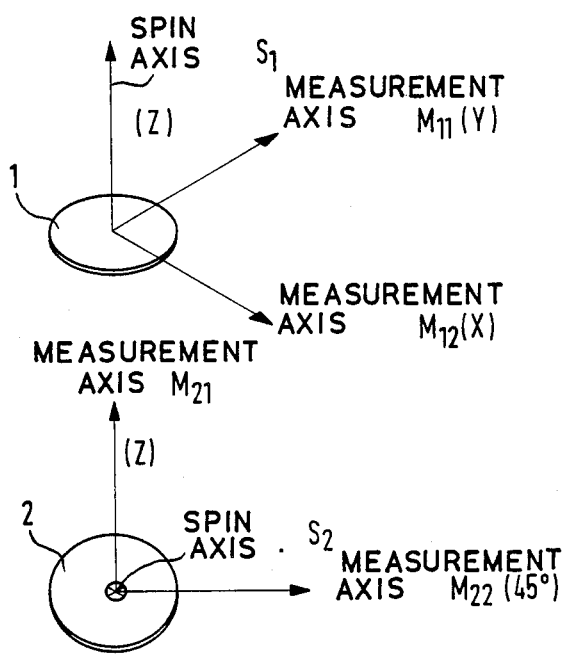
FIG. 1 is a diagrammatic view of a strapdown system that includes a pair of gyroscopes, each having two measuring axes arranged in accordance with the invention.

FIG. 1 is a diagrammatic view of a strapdown gyroscope system that includes dry tuned gyroscopes (represented by functional axes) 1 and 2. As shown in the figure, the tuned gyroscopes 1 and 2 are aligned in such a way that their spin axis $S_1$ and $S_2$ are mutually orthogonal. The spin axis $S_1$ of the gyroscope 1 is oriented in the direction of the yaw axis (Z axis) of the aircraft while the spin axis $S_2$ of the gyroscope 2 is aligned with the aircraft's pitch axis. One of the measuring axes (for example the X measuring axis $M_{21}$) points in the direction of the yaw axis.

The measurement axis system of FIG. 1 is obtained if the gyroscope 1 (with associated spin axis $S_1$) is aligned with the aircraft yaw axis in such a way that the two measurement axes $M_{11}$ and $M_{12}$ of gyroscope 1 are oriented at 45 degrees to the measurement axis $M_{22}$ of the gyroscope 2 whose spin axis is orthogonal to the yaw axis.

Figure 2:
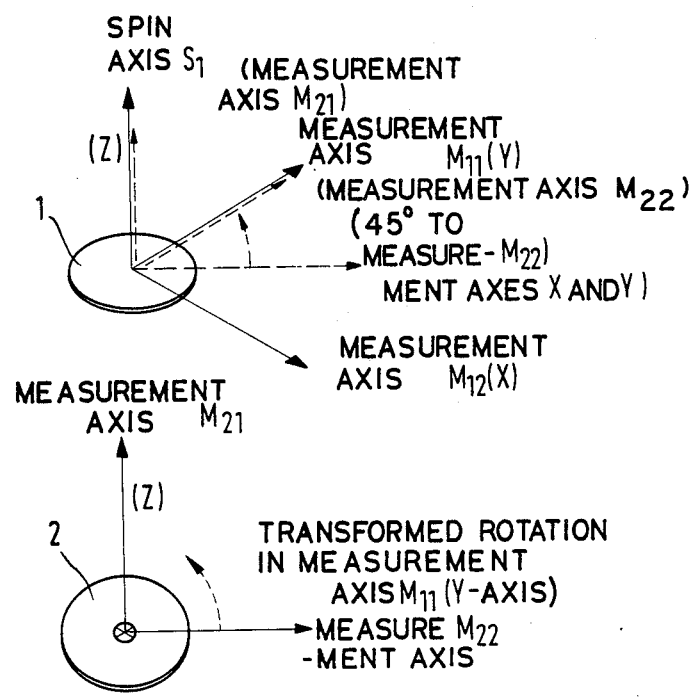

FIGS. 2 and 3 are diagrammatic view of axis transformations for forming the strapdown gyroscope system arrangement of the present invention. In FIG. 2 the transformation as shown renders the Y measurement axis (axis $M_{11}$ of FIG. 1) double redundant. In FIG. 3, the transformation of the X measurement axis (axis $M_{12}$ of FIG. 1) renders that axis double redundant. In each case the transformation is accomplished by computer means according to an appropriate transformation matrix.

The invention is based upon the fact that, when two gyroscopes, each having two degrees of freedom, are employed in a strapdown device, only three of the four available measurement axes are utilized. One of such axes is therefore redundant. In accordance with the invention, the four measurement axes are displaced so that (a) three of the axes are located orthogonally to one another, (b) the fourth measurement axis is located at 45 degrees to the two horizontal axes and (c) at right angles to the vertical axes. Such an arrangement provides an axis system in which the measurement axis at 45 degrees to the horizontal axis can, depending upon location, be transformed to one of the two horizontal axes. In this way, three measured values are obtained for each of the two (pitch and roll) horizontal axes with two strapdown devices. (It is well known that the pitch and roll control circuits are particularly critical in fixed wing aircraft and in helicopters. The yaw axis is less critical to both applications).

The invention offers a number of technical and economical advantages to the user. Such advantages include the requirement of only two strapdown devices. The devices may be arranged in a parallel, anti-parallel or orthogonal relationship. The strapdown devices can be moved apart within the aircraft to then reduce vulnerability.

Thus it is seen that the invention provides new and improved apparatus for aircraft stabilization and control. By utilizing the teachings of the invention one may attain triple redundancy for at least two of an aircraft's axes. Only two strapdown devices or systems are required and they may be located in a parallel, anti-parallel or orthogonal relationship. The devices may further be separated in the aircraft to reduce vulnerability.

While this invention has been described with respect to its presently preferred embodiment, it is not limited thereto. Rather, the scope of the invention is defined by the following set of claims and includes all equivalents thereof.

What is claimed is:

1. Apparatus for stabilization and control of an aircraft comprising, in combination:
   (a) a pair of strapdown devices, said devices being rigidly oriented in space with respect to each other;
   (b) each of said devices including two two-axis measuring gyroscopes;
   (c) measurement axes of said gyroscopes of each device having different arrangements in the horizontal plane so that triple redundancy of measurement is provided by said apparatus for at least two aircraft axes; and
   (d) said arrangement of measurement axes in the horizontal plane is defined by a computational transformation.

2. Apparatus as defined in claim 1 wherein said strapdown devices are located at separated positions within said aircraft.

3. Apparatus as defined in claim 1 wherein said gyroscopes of each device are arranged so that;
   (a) the spin axes are orthogonal;
   (b) the spin axis of the first gyroscope is aligned with the yaw axis of the aircraft;
   (c) the spin axis of the second gyroscope is aligned with the pitch axis of the aircraft;
   (d) a first measurement axis of said second gyroscope is aligned in the direction of said yaw axis; and;
   (e) the measurement axes of said first gyroscope are orthogonal and oriented at an angle of 45 degrees with respect to the second measurement axis of said second gyroscope.

4. Apparatus as defined in claim 1 wherein said gyroscopes of said strapdown devices are arranged as follows:
   (a) the spin axis of the first gyroscope is aligned with the yaw axis of said aircraft;
   (b) the spin axis of the second gyroscope is aligned at a right angle to that of said first gyroscope and at 45 degrees to a preselected aircraft axis;
   (c) one measurement axis of said second gyroscope is aligned with the yaw axis of said aircraft; and;
   (d) the measurement axis of said first gyroscope is aligned with said preselected axis.

5. Apparatus as defined in claim 4 wherein said preselected axis is the pitch axis.

6. Apparatus as defined in claim 4 wherein said preselected axis is the roll axis.

7. A strapdown device for stabilization and control of an aircraft comprising, in combination:
   (a) a pair of two-axis measuring gyroscopes;
   (b) the spin axes of said gyroscopes are orthogonal;
   (c) the spin axis of the first gyroscope is aligned with the yaw axis of said aircraft;
   (d) the spin axis of the second gyroscope is aligned with the pitch axis of said aircraft;
   (e) a first measurement axis of said second gyroscope is aligned in the direction of said yaw axis; and
   (f) the measurement axes of said first gyroscope are orthogonal and oriented at an angle of 45 degrees with respect to the second measurement axis of said second gyroscope.

8. A strapdown device for stabilization and control of an aircraft comprising in combination
   (a) a pair of two axis measuring gyroscopes;
   (b) the spin axis of the first gyroscope is aligned with the yaw axis of said aircraft;
   (c) the spin axis of the second gyroscope is aligned at a right angle to that of said first gyroscope and at 45 degrees to a preselected aircraft axis;
   (d) one measurement axis of said second gyroscope is aligned with the yaw axis of said aircraft; and;
   (e) the measurement axis of said first gyroscope is aligned with said preselect axis.

9. A strapdown device is defined in claim 8 wherein said preselected axis is the pitch axis.

10. A strapdown device as defined in claim 8 wherein said preselected axis is the roll axis.

* * * * *